United States Patent
Skertic et al.

(10) Patent No.: US 11,456,891 B2
(45) Date of Patent: Sep. 27, 2022

(54) APPARATUS AND METHODS FOR AUTHENTICATING CYBER SECURE CONTROL SYSTEM CONFIGURATIONS USING DISTRIBUTED LEDGERS

(71) Applicants: Rolls-Royce North American Technologies Inc., Indianapolis, IN (US); Rolls-Royce Corporation, Indianapolis, IN (US)

(72) Inventors: Richard Joseph Skertic, Carmel, IN (US); John Joseph Costello, Indianapolis, IN (US)

(73) Assignees: ROLLS-ROYCE NORTH AMERICAN TECHNOLOGIES INC., Indianapolis, IN (US); ROLLS-ROYCE CORPORATION, Indianapolis, IN (US)

( * ) Notice: Subject to any disclaimer, the term of this patent is extended or adjusted under 35 U.S.C. 154(b) by 796 days.

(21) Appl. No.: 16/283,643

(22) Filed: Feb. 22, 2019

(65) Prior Publication Data
US 2020/0204400 A1    Jun. 25, 2020

Related U.S. Application Data

(60) Provisional application No. 62/785,601, filed on Dec. 27, 2018, provisional application No. 62/783,017, (Continued)

(51) Int. Cl.
*H04L 29/06* (2006.01)
*H04L 12/437* (2006.01)
(Continued)

(52) U.S. Cl.
CPC ............ *H04L 12/437* (2013.01); *B64D 31/06* (2013.01); *F02C 7/26* (2013.01); *G05B 19/0425* (2013.01);
(Continued)

(58) Field of Classification Search
CPC ..... H04L 12/437; H04L 9/006; H04L 9/0618; H04L 9/0637; H04L 9/0643;
(Continued)

(56) References Cited

U.S. PATENT DOCUMENTS 7,046,621 B2    5/2006  Wang et al.
7,444,401 B1 *  10/2008 Keyghobad ......... H04L 43/0817
                                                  709/224
(Continued)

OTHER PUBLICATIONS

IoTChain: A Blockchain Security Architecture for the Internet of Things https://halarchives-ouvertes.fr/hal-01705455, Feb. 9, 2018, 7pgs.
(Continued)

*Primary Examiner* — Malcolm Cribbs
(74) *Attorney, Agent, or Firm* — Crowell & Moring LLP

(57) ABSTRACT

Control systems and methods for securely authenticating and validating a control system. The control system may include a plurality of dependent control nodes and master control nodes. Each dependent control node is communicatively coupled to one or more peripheral devices. Each control node maintains a unit level distributed ledger, where each unit level distributed ledger includes information from corresponding peripheral devices. Each control node may transmit a portion of the unit level distributed ledger to a master control node. Each master control node may maintain a system level distributed ledger that includes information from the corresponding unit level distributed ledgers. Each master node may transmit a portion of the system level distributed ledger to a central node that maintains a separate secure distributed ledger. The master node may authenticate the control system based on the received portion of the system level distributed ledgers and the secure distributed ledgers.

15 Claims, 11 Drawing Sheets

Related U.S. Application Data filed on Dec. 20, 2018, provisional application No. 62/782,984, filed on Dec. 20, 2018.

(51) Int. Cl.

| | | |
|---|---|---|
| *H04L 9/06* | (2006.01) | |
| *G05B 19/042* | (2006.01) | |
| *H04L 9/00* | (2022.01) | |
| *G06F 16/23* | (2019.01) | |
| *B64D 31/06* | (2006.01) | |
| *F02C 7/26* | (2006.01) | |
| *G06F 16/182* | (2019.01) | |
| *G06F 12/1018* | (2016.01) | |
| *G06F 21/12* | (2013.01) | |
| *G06F 21/57* | (2013.01) | |
| *H04L 9/32* | (2006.01) | |
| *H04L 9/08* | (2006.01) | |
| *H04L 9/40* | (2022.01) | |

(52) U.S. Cl.
CPC ........ *G06F 12/1018* (2013.01); *G06F 16/182* (2019.01); *G06F 16/2379* (2019.01); *G06F 21/125* (2013.01); *G06F 21/575* (2013.01); *H04L 9/006* (2013.01); *H04L 9/0618* (2013.01); *H04L 9/0637* (2013.01); *H04L 9/0643* (2013.01); *H04L 9/0825* (2013.01); *H04L 9/3242* (2013.01); *H04L 9/3263* (2013.01); *H04L 63/0435* (2013.01); *H04L 63/062* (2013.01); *H04L 63/0823* (2013.01); *H04L 63/123* (2013.01); *H04L 9/50* (2022.05); *H04L 2463/062* (2013.01)

(58) Field of Classification Search
CPC ... H04L 9/0825; H04L 9/3242; H04L 9/3263; H04L 63/0435; H04L 63/062; H04L 63/0823; H04L 63/123; H04L 2209/38; H04L 2463/062; G06F 16/182; G06F 16/2379; G06F 12/1018; G06F 21/125; G06F 21/575; B64D 31/06; F02C 7/26; G05B 19/0425

See application file for complete search history.

(56) References Cited

U.S. PATENT DOCUMENTS

| | | |
|---|---|---|
| 8,443,183 B2 | 5/2013 | Lin et al. |
| 8,788,839 B1 | 7/2014 | Dong et al. |
| 8,842,524 B2 | 9/2014 | Dake |
| 9,407,437 B1 | 8/2016 | Campagna |
| 9,733,950 B2 | 8/2017 | Samuel et al. |
| 10,013,573 B2 | 7/2018 | Dillenberger |
| 10,114,969 B1 | 10/2018 | Chaney et al. |
| 11,057,240 B2 | 7/2021 | Skertic et al. |
| 2005/0257073 A1 | 11/2005 | Bade et al. |
| 2008/0144643 A1 | 6/2008 | Berg |
| 2009/0138727 A1 | 5/2009 | Campelio de Souza |
| 2012/0210115 A1 | 8/2012 | Park et al. |
| 2016/0226657 A1 | 8/2016 | Thom et al. |
| 2017/0243011 A1 | 8/2017 | Tschache |
| 2017/0243012 A1 | 8/2017 | Karame et al. |
| 2018/0025181 A1 | 1/2018 | Barinov et al. |
| 2018/0165476 A1 | 6/2018 | Carey et al. |
| 2018/0191502 A1 | 7/2018 | Karame |
| 2018/0218003 A1 | 8/2018 | Banga et al. |
| 2018/0219671 A1 | 8/2018 | Velissarios et al. |
| 2018/0225651 A1* | 8/2018 | Stone ..................... G06Q 20/12 |
| 2019/0013933 A1* | 1/2019 | Mercuri ................. G06F 16/27 |
| 2019/0327299 A1* | 10/2019 | Diamanti ............ H04L 67/1095 |
| 2020/0167342 A1* | 5/2020 | Shin .................... H04L 41/0896 |
| 2020/0167459 A1* | 5/2020 | Viale ...................... G06F 21/33 |

OTHER PUBLICATIONS

Dejan Vujicic, et al., "Blockchain Technology, Bitcoin, and Ethereum: A Brief Overview," dated at least as early as Apr. 2018, 17th International Symposium INFOTEH-JAHORINA (INFOTEH), East Sarajevo, Republic of Srpska, Bosnia and Herzegovina.

\* cited by examiner

US 11,456,891 B2

APPARATUS AND METHODS FOR AUTHENTICATING CYBER SECURE CONTROL SYSTEM CONFIGURATIONS USING DISTRIBUTED LEDGERS

CROSS-REFERENCE TO RELATED APPLICATIONS

This application claims priority to U.S. Provisional Application No. 62/782,984, filed Dec. 20, 2018, title: SECURE ENGINE COMMUNICATION; U.S. Provisional Application No. 62/785,601, filed Dec. 27, 2018, title: A METHOD AND PROCESS FOR BLOCKCHAIN IMPLEMENTATION WITH THIRD PARTY DEVICES; U.S. Provisional Application No. 62/783,017, filed Dec. 20, 2018, title: BLOCKCHAIN BASED VEHICLE CONTROL; and is related to U.S. application Ser. No. 16/283,644, filed Feb. 22, 2019, title: A METHOD AND PROCESS FOR SECURING AN EXECUTABLE IMAGE. The entirety of these applications are herein incorporated by reference.

BACKGROUND

Aircrafts, such as commercial and military aircraft, include aerospace control systems that control and monitor aircraft engines. The aerospace control systems may control and/or monitor aerospace control system components such as, for example, aircraft engine pressure sensors, temperature sensors, solenoids, and actuators. The aerospace control systems may also control and/or manage other aircraft engine parts and/or functionality. For example, aerospace control systems may assist in ensuring optimum aircraft engine efficiencies during flight are achieved by receiving various flight condition information and controlling various aircraft engine operations, such as fuel flow, valve positions, and others. Aerospace control systems may include a full authority digital engine controller ("FADEC") that includes an electronic engine controller ("EEC") or engine control unit ("ECU"). The FADEC may further include a central processing unit ("CPU"), memory, and a data bus to communicate with other aircraft engine components, such as aircraft engine sensors and actuators. In addition, the FADEC may include maintenance ports and/or communication ports. These ports include connector interfaces for various connector types such as Ethernet ports, serial ports, and/or universal serial bus ("USB") ports, among others, that may connect with different parts of the aircraft.

Aerospace control systems may be implemented as a centralized (or federated) control system ("CCS") architecture design or a distributed control system ("DCS") architecture design. Aerospace control systems incorporating a CCS architecture design include a FADEC with a CPU that handles all processing functions as generally shown in FIG. 1A. The FADEC also includes additional electronic circuitry required for data acquisition (such as from the various sensors) as well as signal conditioning. In addition, interface (e.g., wire) harnesses may be used to connect the various aerospace control system components, such as sensors and/or actuators to the FADEC.

An aerospace control system incorporating a DCS architecture design, however, may not require a FADEC with this additional circuitry. Instead, the various aerospace control system components (e.g., sensors and/or actuators) include local processing capabilities that can relay information to the FADEC's CPU as shown in FIG. 1B. In addition, a DCS architecture design includes digital communication between the FADEC and the various sensors and/or actuators, rather than interface harnesses. Aerospace control systems with a DCS architecture design may also employ a data concentrator (e.g., concentrator node) that provides for communication with both components that do not include local processing capabilities as well as components that do include local processing capabilities. The data concentrator facilitates the communications between the FADEC and the nodes.

These aerospace architectures, however, have vulnerabilities during operation in a cyber-hostile environment. For example, threats from a cyber-attack can come from software loaded onto the FADEC via one of the FADEC's maintenance or communication ports. Threats may also come from hacking into access points over communication links between the FADEC and other parts of the aerospace control system, such as sensors and actuators. In addition, aerospace architectures are vulnerable to "hardware hacks," where hardware, such as the FADEC or a communication link, is physically altered to allow access to the aerospace control system. Cyber threats may also include attempts to passively extract executable code or software images using software operating over serial interfaces (e.g., JTAG, RS 232, USB, etc.). Cyber threats may also include attempts to offensively extract executable code or software images by, for example, directly accessing or the removal of flash memory. In yet other examples, cyber threats may include the extraction, de-compilation, and analysis of firmware images, as well as the manipulation of firmware images, to gain access to, and exploit, communications or controls, or to attack some other area of functionality.

At least some engine manufacturers are the type certificate holder for all aspects of their engines, engine controls, communications networks, power distributions, etc. The certification framework of FAA and EASA typically requires new engine systems to be cyber secure. Thus, an engine manufacturer is typically responsible for the security of the data and controls used in the engine network to process sensor data, operate actuators, handling communications with the airframe, and monitoring safety and criticality issues, among other responsibilities. Engine manufacturers typically work with external suppliers (e.g., third party vendors) to manufacture smart sensors or other similar products or components, which may include electronic interfaces for communication with an engine. These electronic interfaces, however, may pose additional risks for cyber hacking via third party interactions.

To address potential weaknesses with, for example, the authenticity of third party components (e.g., confirm provenances of parts) and/or confirm software configurations, a secure methodology to validate that third party components are the ones designed, developed, qualified and/or certified for a manufacturer's engine is advantageous.

SUMMARY

A method for securely controlling a braided ring network having plural dependent control nodes and plural master control nodes is presented. Each of the plural control nodes may be associated with a respective distributed I/O node. The distributed I/O nodes may interface with at least one peripheral device. The method may include: at each of the plural control nodes: maintaining a unit level distributed ledger, where the unit level distributed ledger may include information from distributed I/O nodes associated with the respective control nodes; and transmitting the portion of the unit level distributed ledger to a respective one of the plural master control nodes. At each of the plural master control nodes the method may further include: maintaining, a system level distributed ledger, where the system level distributed ledger may include information from the unit level distributed ledger of the control nodes associated with the respective master control node; and transmitting the portion of the system level distributed ledger to a central processor. At the central processor the method may also include: maintaining a separate central distributed ledger for each of the system level distributed ledgers received from the master control nodes.

Some embodiment of the method may include: comparing a respective received system level distributed ledger with the respective central distributed ledger, where the braided ring network may control the operation of a machine, and the machine is operated based on the comparison. Other embodiments may include updating the unit level distributed ledgers, system level distributed ledgers, and the central distributed ledgers subsequent the operation of the machine. Another embodiment may also include at each of the distributed I/O nodes: maintaining a device level distributed ledger, where the device level distributed ledger may include a local hash of information related to the at least one peripheral device associated with the distributed I/O; and transmitting a portion of the device level distributed ledger to the respective control node. Some embodiments may employ the peripheral device as a sensor or actuator. According to some embodiments the machine may be a gas turbine and the operation may involve starting the gas turbine. Other embodiments of the method may include, at the control node, comparing a portion of the respective device level distributed ledger with the respective unit level distributed ledger and operating a machine based on the comparison. Some embodiments may further include, at the master control node, comparing a portion of respective unit level distributed ledger with the respective system level distributed ledger and operating a machine based on the comparison. According to other embodiments the portion of the unit level distributed ledger may include a hash. A portion of the system level distributed ledger may also include a hash. Transmission of the portion of the unit level distributed ledger to the respective one of the plural master control nodes may include encrypting a message with one of a private key or public key. Transmission of the portion of the system level distributed ledger to the central processor may also include encrypting a message with one of a private key or public key. The unit level distributed ledger may include a digital certificate and data from at least a preceding engine start, where the transmission of the portion of the unit level distributed ledger to the respective one of the plural master control nodes may further include updating the unit level distributed ledger. In some embodiments the data may include the manufacturer, serial number of the smart node, software configuration, date of manufacture, date of qualification, public key or a preceding hash. Updating the unit level distributed ledger further may include deleting a preceding block from the unit level distributed ledger.

Also presented is a method of communicating with plural control nodes in a gas turbine engine, which may include: requesting, from a master control node, information from each of the control nodes; comparing the information from each of the control nodes with a distributed ledger maintained at the master node; determining an authenticated set of control nodes based upon the comparison; arranging the information form each of the control nodes in the authenticated set of control nodes; creating a hash of the information; comparing the hash of the information with a securely stored control hash. Based on the comparison, continuing communication between the master control node and the set of control nodes; where the information from the control nodes may include a hash of operations characteristics of the control node. The control hash may be generated upon installation of the control node on the gas turbine.

A method for authenticating a configuration on a gas turbine prior to operation is also presented. The method may include: maintaining a distributed ledger at a control module of the gas turbine and a second distributed ledger at a master control node. The distributed ledger and the second distributed may include successive information blocks. The information blocks each may include information reflective of at least one component. The method may also include receiving a message at the control module from the at least one component; determining, at the control module, a control hash based upon information in the message reflective of the at least one component; receiving a second message at a master control node from the control module, which may include the control hash; determining, at the master control node, a hash based at least upon the second message; comparing, at the master control node, the hash to the control hash. Finally based upon the comparison, the method may allow the system to authenticate the component, update the distributed ledger as a function of the second message; and operate the gas turbine. The method may include receiving the message at the control module from the at least one component and decrypting the message with one of a private key or public key. Receipt of the second message at the master module from the control node may include decrypting the message with one of a private key or public key.

BRIEF DESCRIPTION OF THE DRAWINGS

The following will be apparent from elements of the figures, which are provided for illustrative purposes.

DETAILED DESCRIPTION

Figure 1A:
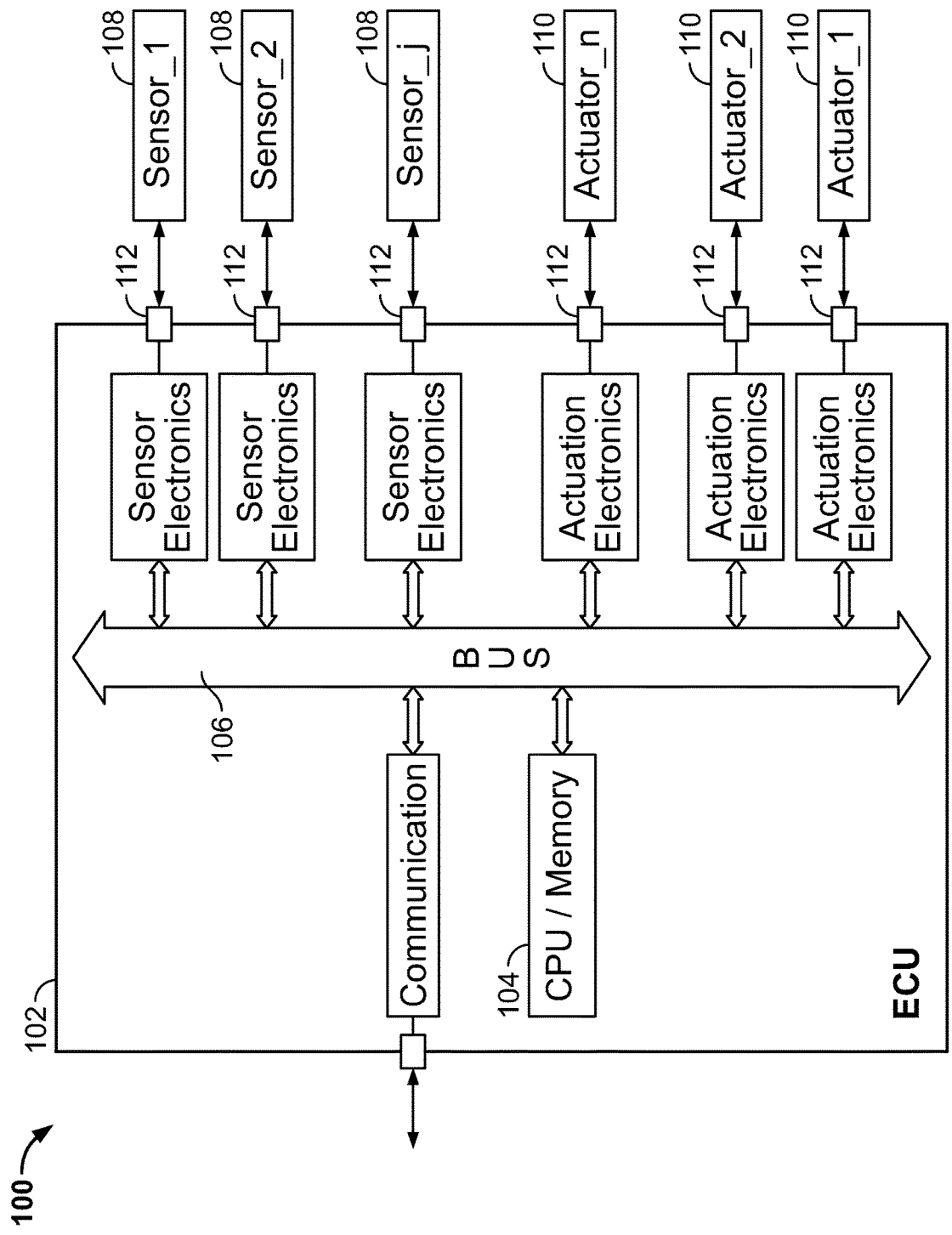
FIGS. 1A and 1B are respective illustrations of a Centralized Control System and a Distributed Control System for of an engine.

For the purposes of promoting an understanding of the principles of the disclosure, reference will now be made to a number of illustrative embodiments in the drawings and specific language will be used to describe the same. While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

FIG. 1A illustrates a Centralized Control System (CCS) 100 that has been optimized to control (e.g., run) an aircraft engine. CSS 100 may include signaling from an Engine Control Unit (ECU) 102 to sensors 108 and actuators 110. The signaling may allow for the receiving of data from sensors 108 and/the transmission of control signals to actuators 110, for example. The signaling may include analog or digital communications, for example. In this topology, a data bus 106 connecting ECU 102 to sensors 108 and actuators 110 provides a major point of entry for a potential cyberattack to a CPU and memory 104 within the ECU 102. In addition to data bus 106, external hardware interfaces 112 may also be points of ingress for a cyber-attack.

Figure 1B:
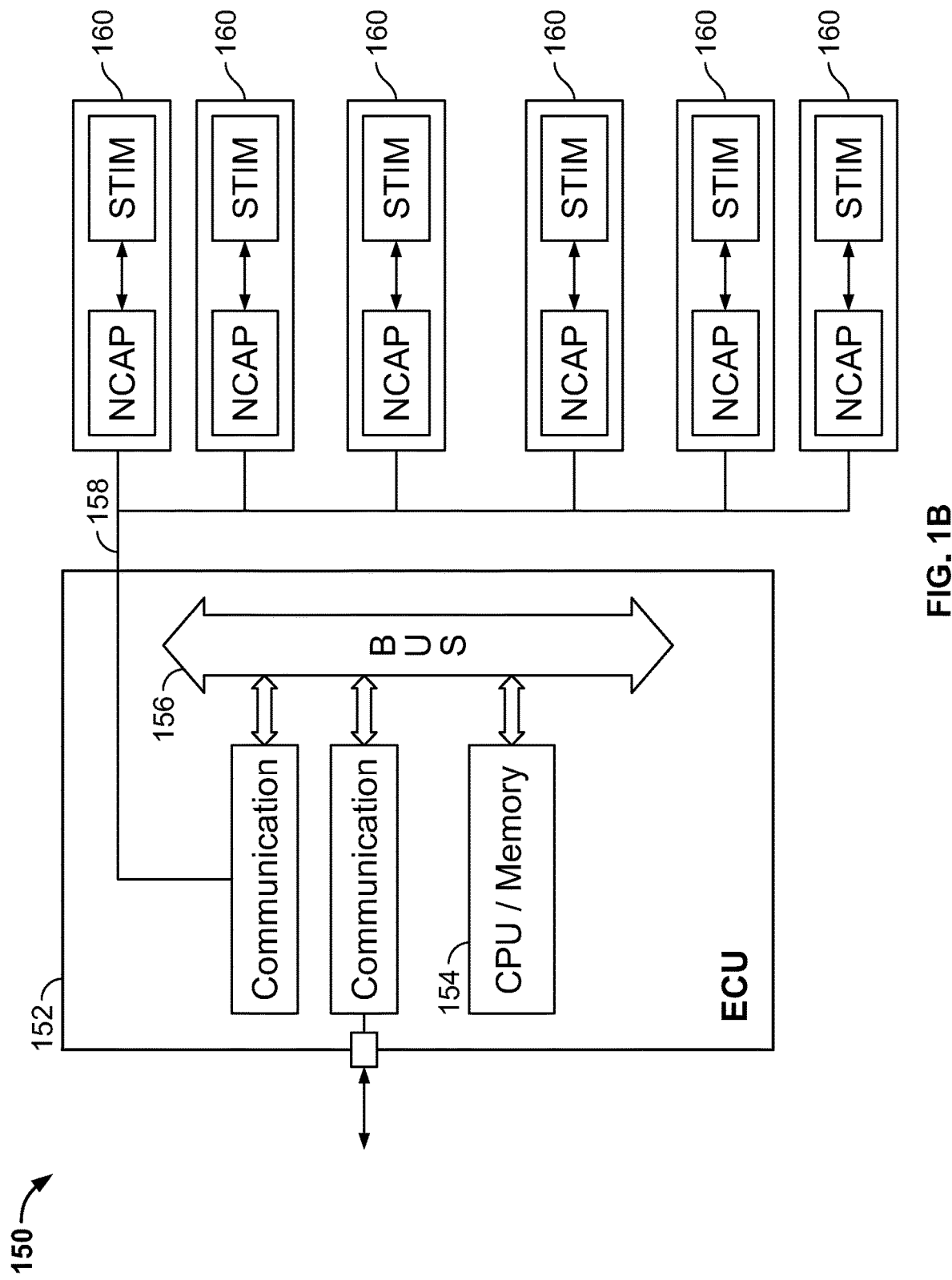

FIG. 1B illustrates a Distributed Control System (DCS) 150 that includes an ECU and memory 154 and a data bus 156. Although DCS 150 offers some control advantages over CCS 100 illustrated in FIG. 1A, both control architectures have vulnerabilities during operation in cyber hostile environments. DCS 150 has additional access points over the communications link 158 between ECU 152 and the control/actuation nodes 160 where a cyber-attack may gain entrance to the control system. Areas of susceptibility may include maintenance ports, connector interfaces for traditional connectors, and Ethernet and serial communication ports. When combined with the potential for smart sensors or smart nodes, the cyber threats may be even more significant as these nodes will have integral microprocessors and software for functionality.

Figure 2A:
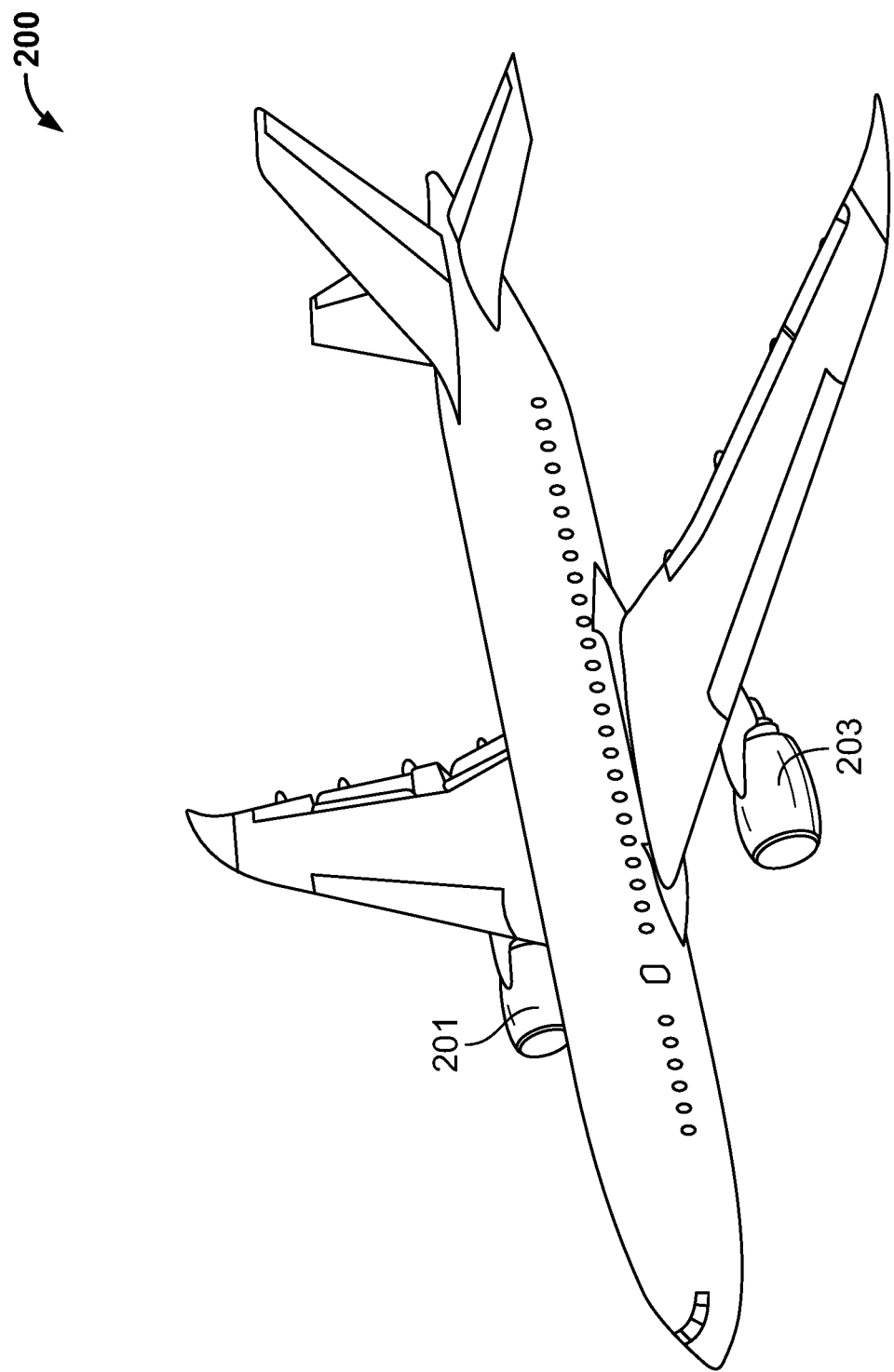
FIG. 2A is an illustration of an aircraft engine employing an engine control system in accordance with some embodiments.

FIG. 2A illustrates an example aircraft 200 with turbine engines 201, 203. Each turbine engine may be controlled by an engine control system, which is discussed in more detail with respect to FIG. 2B.

Figure 2B:
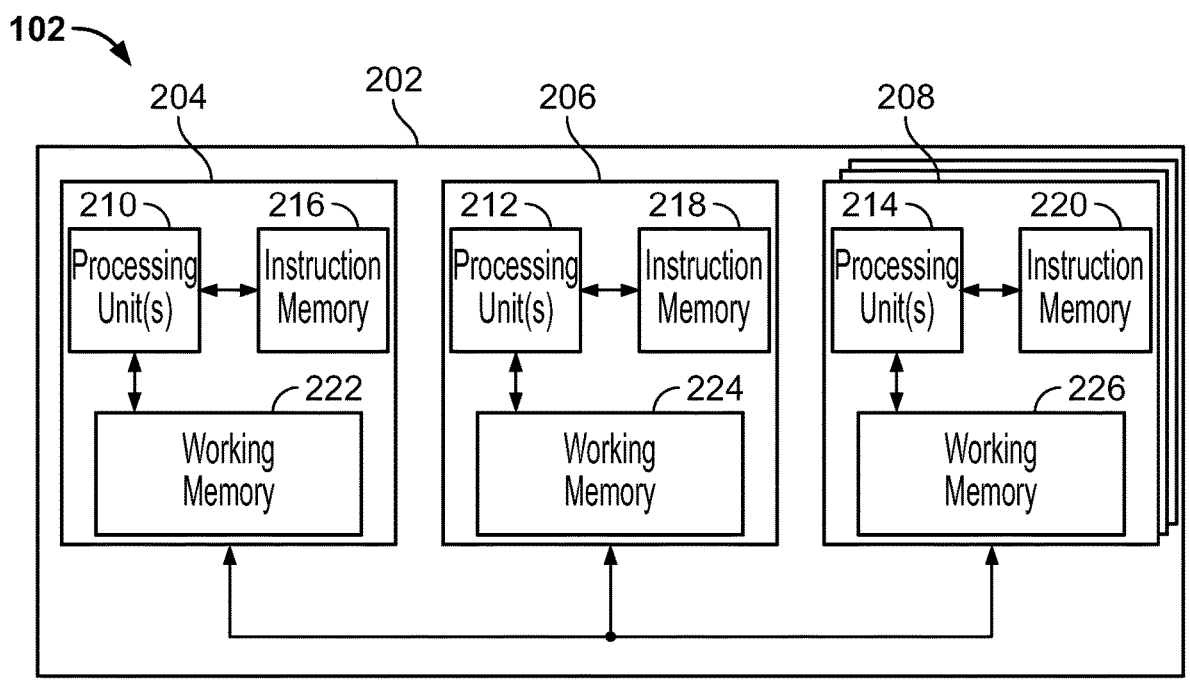
FIG. 2B illustrates a block diagram of an engine control system in accordance with some embodiments.

FIG. 2B illustrates an aircraft engine 201, 203 of the example aircraft 200 of FIG. 1 in more detail. Each aircraft engine 201, 203 may include an engine control system 202 that includes one or more control nodes 204, a concentrator node 206, and multiple electronic security modules (ESMs) 208. A control node 204 may be, for example, a FADEC. In some examples, one or more of ESMs 208 may be a hardware security module (HSM) or a trusted protection module (TSM). Each control node 204, concentrator node 206, and multiple ESMs 208 may include one or more processing units 210, 212, 214. A processing unit can be, for example, a processor, a microprocessor, an execution unit or "core" on a microprocessor chip, a digital signal processor (DSP), a soft or hard core within a field-programmable gate arrays (FPGA), a processor within an application-specific integrated circuit (ASIC), a general processing unit (GPU), a commercial off the shelf (COTS) processor, or any other suitable processor. For example, any one of ESM 208 may include a secure crypto-processor chip, or may use a combination of integrated circuits to make itself more tamper resistant. In addition to including any crypto-processors, ESM 208 may be certified to international standards and the designs may use different electronics, algorithms, and encryption techniques to provide a level of security for the ESM's memory.

ESM 208 may also include an instruction memory 220. Instruction memory 220 can store instructions that can be accessed (e.g., read) and executed by processing unit 214. For example, instruction memory 220 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Instruction memory 220 may also store data and instructions that may not be executed by processing unit 214. For example, as described in more detail below, instruction memory 220 may store executable instructions (e.g., software images) that are configured to be loaded to one or both of control node 204 and concentrator node 206 by ESM 208.

Each of the control node 204, concentrator node 206, and ESM 208 may also include working memory 222, 224, 226, respectively. Processing units 210, 212, 214 can store data to, and read data from, working memory 222, 224, 226, respectively. For example, processing unit 214 of the ESM 208 can store a working set of instructions to working memory 226, such as instructions loaded from instruction memory 220. Processing units 210, 212, 214 can also use working memory 222, 224, 226, respectively, to store dynamic data.

ESM 208 may be commutatively coupled to control node 204 and concentrator node 206. Processing unit 214 of ESM 208 may be configured to provide instructions from instruction memory 220 to control node 204. For example, processing unit 214 may provide instructions from instruction memory 220 to working memory 222 of control node 204. Processing unit 210 may then execute the instructions from working memory 218.

Similarly, processing unit 214 may be configured to provide instructions from instruction memory 220 to concentrator node 206. For example, processing unit 214 may provide instructions from instruction memory 220 to working memory 224 of concentrator node 206. Processing unit 212 of concentrator node 206 may then execute the instructions from working memory 224. The instructions may be provided by processing unit 214 to control node 204 and concentrator node 206 as part of a power-up procedure, for example.

Figure 3:
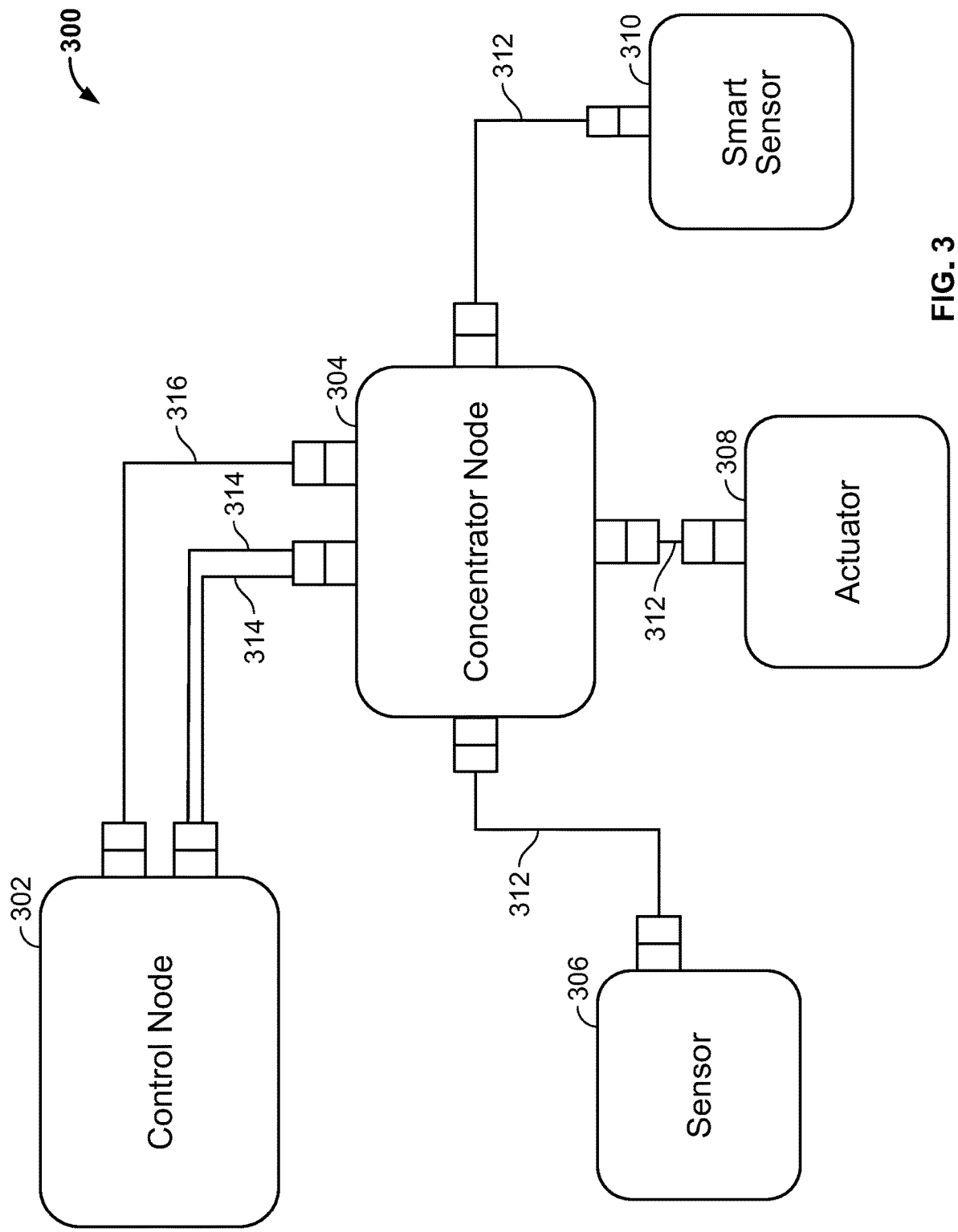
FIG. 3 illustrates a block diagram of an engine control system in accordance with some embodiments.

FIG. 3 illustrates a block diagram of an engine control system 300 that includes a control node 302, a concentrator node 304, one or more sensors 306, one or more actuators 308, and one or more smart sensors 310. Concentrator node 304 is communicatively coupled to each of one or more sensors 306, one or more actuators 308, and one or more smart sensors 310 over communication link 312. For example, concentrator node 304 may communicate with each of one or more sensors 306, one or more actuators 308, and one or more smart sensors 310 over communication link 312, which may be a fiber optic communication link, an Ethernet link, or any other suitable link. Communication link 312 may employ, for example, an interconnect bus architecture. Communication between the control node 302 and the sensor 306, 310 and the actuator 308 in the embodiment shown in FIG. 3 is via the concentrator node.

Sensor 306 may be, for example, an optical sensor, a pressure sensor, a temperature sensor, or any other suitable sensor. Sensor 306 may provide sensor readings over communication link 312 to concentrator node 306. Smart sensor 310 may be a sensor that also provides processing capability.

For example, rather than merely providing raw sensor readings, smart sensor 310 may provide calibrated readings over communication link 312 and/or may bypass the concentrator node 304 and communicate with the control node 302 using the same methodology as employed by the concentrator node 304.

Figure 4:
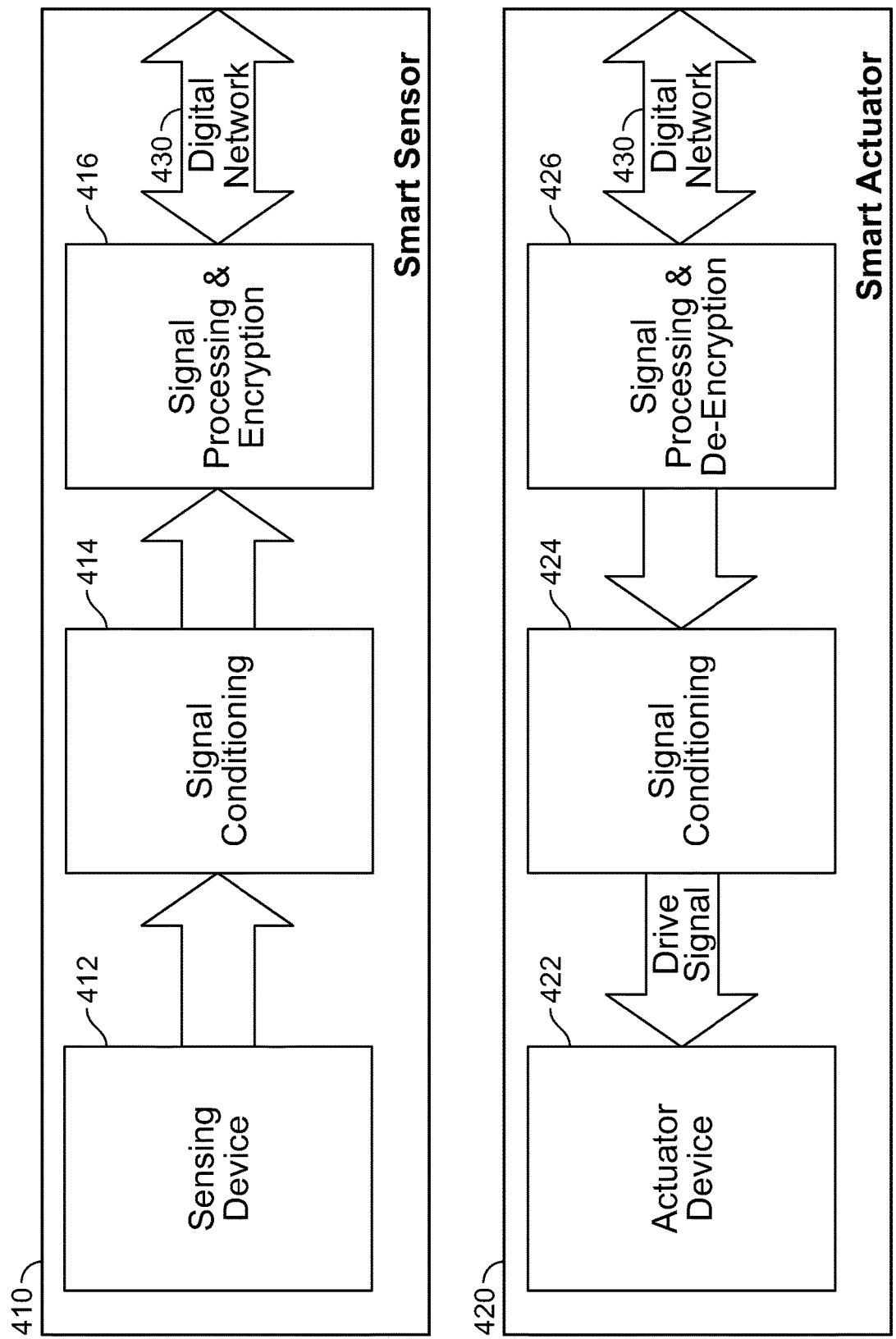
FIG. 4 illustrates a block diagram of an engine control system in accordance with some embodiments.

Referring to FIG. 4, the components of a smart sensor 410 and smart actuator 420 (smart nodes) are shown. Smart nodes complete the analog to digital signal processing, use digital device drivers, complete data translation, and other functions that are required for efficient engine control. These sensors, actuators and processing nodes are considered "smart" since they have the ability to evaluate the sensed value or drive an actuator to provide a digital output. Another variant of the smart node is the data concentrator to process the analog to digital conversion, signal processing, encryption, communications, etc. The sensing device 412 passes the analog signal to the signal conditioning device 414 which scales or as noted previously calibrates the analog signal, the calibrated signal is then operated on by the signal processing and encryption device 416. The output of the signal processing and encryption process is transferred digitally from the smart sensor 410 over a digital network. Likewise is the operation of smart actuator 420, where the actuator device 422 receives calibrated and scaled signals from the signal conditioning device 424, which receives an analog signal from a signal processing and de-encryption device 426. The smart actuator device also sends digital signals back to the control module, such as position data of the actuator in the same manner as the smart sensor 410.

Referring back to FIG. 3, in some examples, concentrator node 306 includes drivers that can connect via a direct link (or over a bus architecture), such as an optical or electrical harness, to one or more actuators 308.

Concentrator node 304 is also communicatively coupled to control node 302 over at least a first communication link 314. The first communication link 314 may be fiber optic, Ethernet, hardwired and/or wireless. First communication link 314 may be a fiber optic link, such as one using multi-mode optical fiber (e.g., a multi-mode fiber optic link), for example. Control node 302 is operable to transmit to, and receive data from, concentrator node 304 over first communication link 314. For example, concentrator node 304 may send sensor readings, such as from one or more sensors 306 or one or more smart sensors 310, to control node 302 over first communication link 314. In addition, control node 302 may send control messages to concentrator node 304, such as control messages to control one or more actuators 308, over first communication link 314. In some examples, communications over first communication link 314 are encrypted.

In some examples, first communication link 314 includes multiple fiber optic links, such as in a braided ring. In some examples, concentrator node 304 is also communicatively coupled to control node 302 over a second communication link 316. Second communication link 316 may also be a fiber optic link, a hardwired link, such as an Ethernet link or wireless. In some examples, control node 302 is operable to transmit to, and receive data from, concentrator node 304 over second communication link 316. In some examples, communications over second communication link 316 are encrypted.

Figure 5:
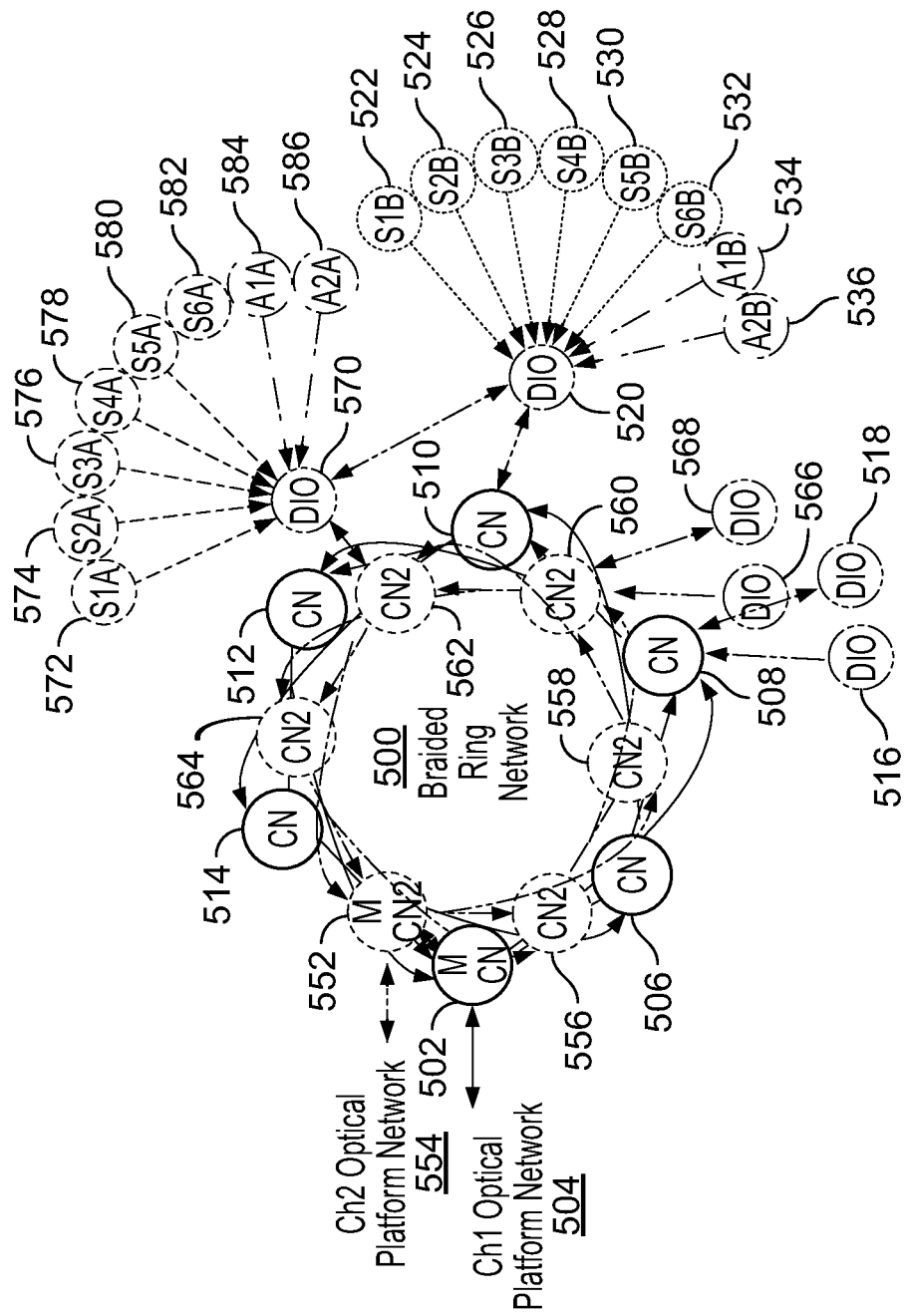
FIG. 5 illustrates a braided ring control network that may be employed by an engine control system in accordance with embodiments of the disclosed subject matter.

FIG. 5 illustrates a braided ring control network 500 that may be employed by, for example, the engine control system 202 of FIG. 2B. Braided control ring control network 500 employs a distributed ledger such as blockchain to secure communications.

As used herein a distributed ledger, such as blockchain, includes a cryptographically secure ledger containing many different transactions. The transactions may be grouped into blocks, where each block may be linked (i.e., chained) together with cryptographic algorithms to form a chain (e.g., block chain). An advantage of distributed ledgers is their integrity. For example, once appended to a block chain for a sufficient amount of time, the ability to revise blocks to add, modify, and/or remove transactions becomes intractable (i.e., substantially impossible).

Braided ring control network 500 may include distributed ledger data from each of a plurality of integral units to create an overarching level of system security in the form of a forked distributed ledger. The distributed ledger enables an interface of an engine controller of the engine control system 202 to, for example, an airframe, as well as to a network, such as the cloud-based Internet of Things (IoT). The braided control network includes a first Master Control Node (MCN) 502 that operates on a first channel 504 of the braided ring control network 500, and a second MCN 552 that operates on a second channel 554 of the braided ring control network 500. Each MCN may be, for example, an ESM 208. Braided ring control network 500 includes a braided ring configuration that has dual redundant control loops to meet safety and airworthiness requirements. For example, braided ring control network 500 may include multiple optical platform networks (e.g., fiber optic networks), where first channel 504 operates over one optical platform network, and second channel 554 operates over a second platform network.

Each MCN 502, 552 is communicatively coupled to one or more Control Nodes (CNs), such as a control node 204, one or more Distributed Input/Output (DIO) nodes, one or more Sensor nodes, and one or more Actuator nodes. For example, MCN 502 may be communicatively coupled over first channel 504 of an optical platform network to CNs 506, 508, 510, 512, 514. Similarly, MCN 552 may be communicatively coupled over second channel 554 of the optical platform network to CNs 556, 558, 560, 562, 564. MCNs 502, 552 control and process data received from the CNs (e.g., slave control nodes).

In some examples, a CN controls one or more DIO nodes. For example, the CN may send data to, and receive data from, a DIO node. In this example, CN 508 is communicatively coupled to DIO nodes 516, 518. Similarly, CN 510 is communicatively coupled to DIO node 520. CN 560 is communicatively coupled to DIO nodes 566, 568, and CN 562 is communicatively coupled to DIO 570. Each DIO node may process signals, such as analog and/or digital signals, from engine sensors, and may provide control signals to operate actuators. For example, as illustrated in FIG. 5, DIO node 520 is communicatively coupled to actuators A1B 534 and A2B 536. DIO node 520 is also communicatively coupled to sensors S1B 522, S2B 524, S3B 526, S4B 528, S5B 530, S6B 532. Similarly, DIO node 570 is communicatively coupled to sensors S1A 572, S2A 574, S3A 576, S4A 578, S5A 580, S6A 582. DIO node 570 is also communicatively coupled to actuators A1A 584 and A2A 586.

To incorporate cyber security into braided ring control network 500, each CN may store data in a distributed ledger (e.g., encrypted distributed ledger), such as a blockchain. For example, a CN may store blockchain data received from a DIO node, such as data identifying a manufacturer, a date of manufacture, a serial number, a qualification history (e.g., date of qualification), built-in-test data such as health data, a public key, a preceding hash (e.g., a hash previously generated), or any other data in a corresponding "unit level" blockchain.

Figure 6:
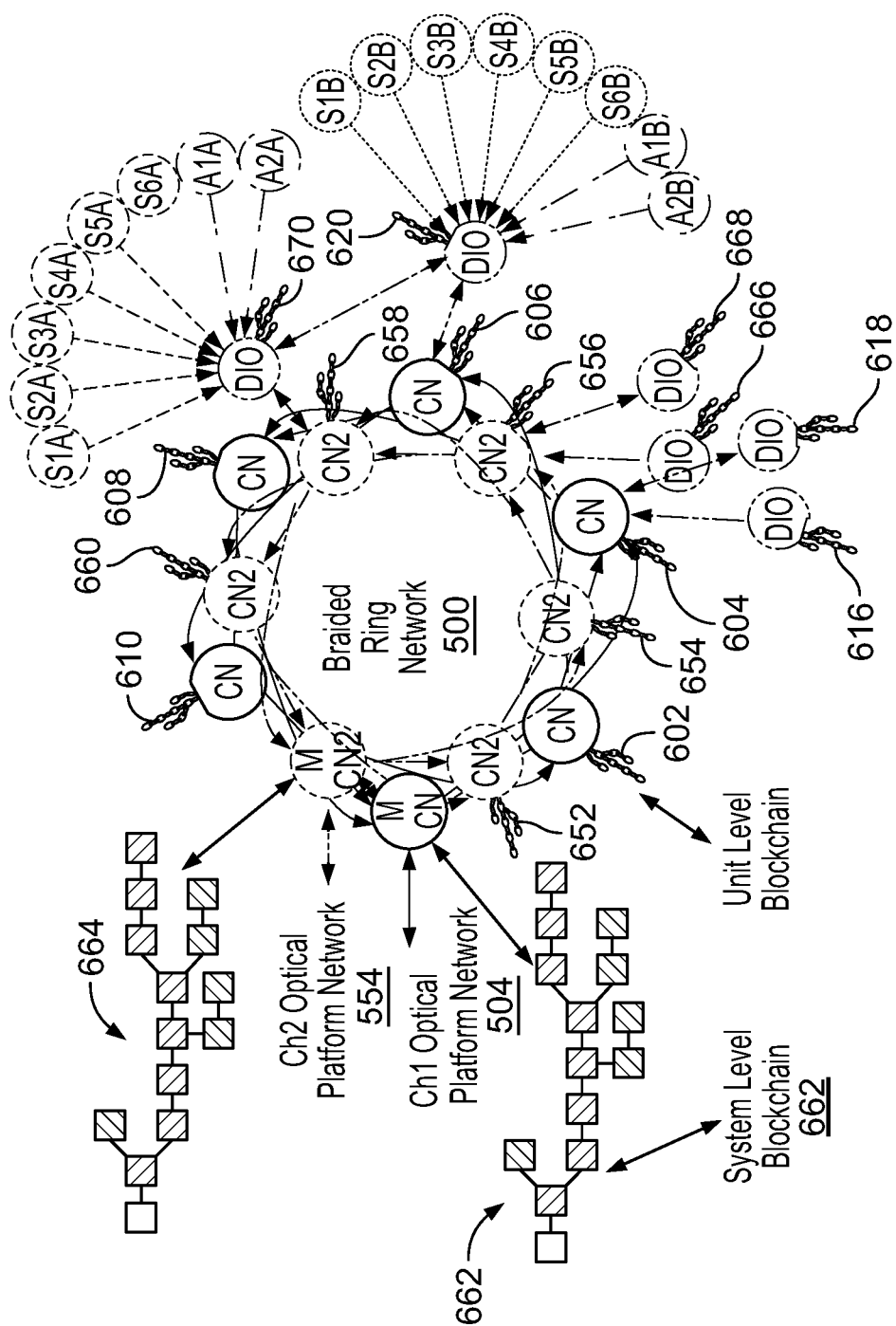
FIG. 6 illustrates another braided ring control network that may be employed by an engine control system in accordance with embodiments of the disclosed subject matter.

As illustrated in FIG. 6, each CN includes a unique blockchain ledger for authentication that may incorporate data from sensors, actuators, and DIO nodes. In this example, CN 506 includes unit level blockchain 602. Similarly, CN 508 includes unit level blockchain 604, CN 510 includes unit level blockchain 606, CN 512 includes unit level blockchain 608, and CN 514 includes unit level blockchain 610. CN 556 includes unit level blockchain 652, CN 558 includes unit level blockchain 654, CN 560 includes unit level blockchain 656, CN 562 includes unit level blockchain 658, and CN 564 includes unit level blockchain 660.

In some examples, each DIO node includes its own "sub-unit" level blockchain. For example, as illustrated in FIG. 6, DIO node 516 includes sub-unit level blockchain 616, DIO node 518 includes sub-unit level blockchain 618, and DIO node 520 includes sub-unit level blockchain 620. Similarly, DIO node 566 includes sub-unit level blockchain 666, DIO node 568 includes sub-unit level blockchain 668, and DIO node 570 includes sub-unit level blockchain 670.

During operation (e.g., at power-up, periodically during operation), DIO nodes may obtain data from corresponding peripheral devices such as sensors and actuators, and may store the data in their corresponding blockchain ledger. For example, DIO node 520 may obtain sensor data from one or more of sensors S1B 522, S2B 524, S3B 526, S4B 528, S5B 530, S6B 532, and may store the data to sub-unit level blockchain 620. DIO node 520 may also obtain data from one or more of actuators A1B 534 and A2B 536, and store the data to sub-unit level blockchain 620. Similarly, DIO node 570 may obtain sensor data from one or more of sensors S1A 572, S2A 574, S3A 576, S4A 578, S5A 580, S6A 582, and may store the data to sub-unit level blockchain 670. DIO node 570 may also obtain data from one or more of actuators A1A 584 and A2A 586, and store the data to sub-unit level blockchain 670. In some examples, the DIO nodes update their respective sub-unit level blockchains based on the received data for corresponding peripheral devices, such as sensors or actuators. For example, the DIO nodes may delete a previous block that was added to their respective blockchains, and store a new block that includes the received data in their respective blockchains.

During operation, such as during a system starting sequence (e.g., at power-up), CNs may obtain blockchain data from DIO nodes, and may store the blockchain data in their corresponding unit level blockchain. For example, CN 508 may obtain data stored in sub-unit level blockchain 616 from DIO node 516 in a blockchain transaction, and store the blockchain data in its corresponding unit level blockchain 604. Similarly, CN 508 may obtain blockchain data stored in stored in sub-unit level blockchain 618 from DIO node 518 in a blockchain transaction, and store the blockchain data in its corresponding unit level blockchain 604. CN 510 may obtain blockchain data stored in sub-unit level blockchain 620 from DIO node 518 in a blockchain transaction, and store the blockchain data in its corresponding unit level blockchain 606. In some examples, CNs 508, 510 updates their corresponding unit level blockchains 604, 606 with the received blockchain data. For example, CNs 508, 510 may delete a previous block that was added to their respective blockchains, and store a new block that includes the received blockchain data in their respective blockchains.

Likewise, CN 560 may obtain blockchain data stored in sub-unit level blockchain 666 and sub-unit level blockchain 668 from DIO nodes 556, 568 in respective blockchain transactions, and store the blockchain data in its corresponding unit level blockchain 656. CN 562 may obtain blockchain data stored in sub-unit level blockchain 670 from DIO node 570 in a blockchain transaction, and store the blockchain data in its corresponding unit level blockchain 658. In some examples, CNs 560, 562 updates their corresponding unit level blockchains 656, 658 with the received blockchain data. For example, CNs 560, 562 may delete a previous block that was added to their respective blockchains, and store a new block that includes the received blockchain data in their respective blockchains.

In some examples, a CN may execute a hashing algorithm on received blockchain data, and may store the hash in its corresponding unit level blockchain. For example, upon receiving blockchain data from a DIO node, a CN may execute a hashing algorithm on the received blocking data to generate a hash. The CN may then update its corresponding unit level blockchain with the generated hash.

CNs may transmit blockchain data stored in their corresponding unit level blockchains (e.g., blockchain ledger data) to one or more MCNs. For example, CNs 506, 508, 510, 512, 514 may, during a system startup procedure, transmit blockchain data in corresponding unit level blockchains 602, 604, 606, 608, 610 to MCN 502. Similarly, CNs 556, 558, 560, 562, 564 may, during the system startup procedure, transmit blockchain data in corresponding unit level blockchains 652, 654, 656, 658, 660 to MCN 552. In some examples, the transmitted blockchain data is encrypted with either a private key or a public key prior to transmission.

Each of MCN 502, 552 may receive the blockchain data and incorporate received blockchain data into corresponding system level blockchains 662, 664 to validate the system. In some examples, the received blockchain data may include a hash generated based on data, as discussed above. In some examples, MCN 502, 552 decrypts the transmitted blockchain data with either a private key or a public key. In some examples, MCN 502, 552 executes a hashing algorithm on the received blockchain data to generate a hash. MCN 502, 552 then updates their respective system level blockchains 662, 664 with the generated hash.

Each of system level blockchains 662, 664 may be compared against a secure blockchain ledger that is securely stored (e.g., securely stored) and accessible via a network. For example, an airframe computer, such as airframe computing device 800 discussed further below with respect to FIG. 8, obtains blockchain data stored in system level blockchains 662, 664 from MCNs 502, 552, respectively, at startup (e.g., power up). The airframe computer may then compare the blockchain data to the secure blockchain ledger to authenticate braided ring control network 500 prior to engine 201, 203 startup.

Figure 7:
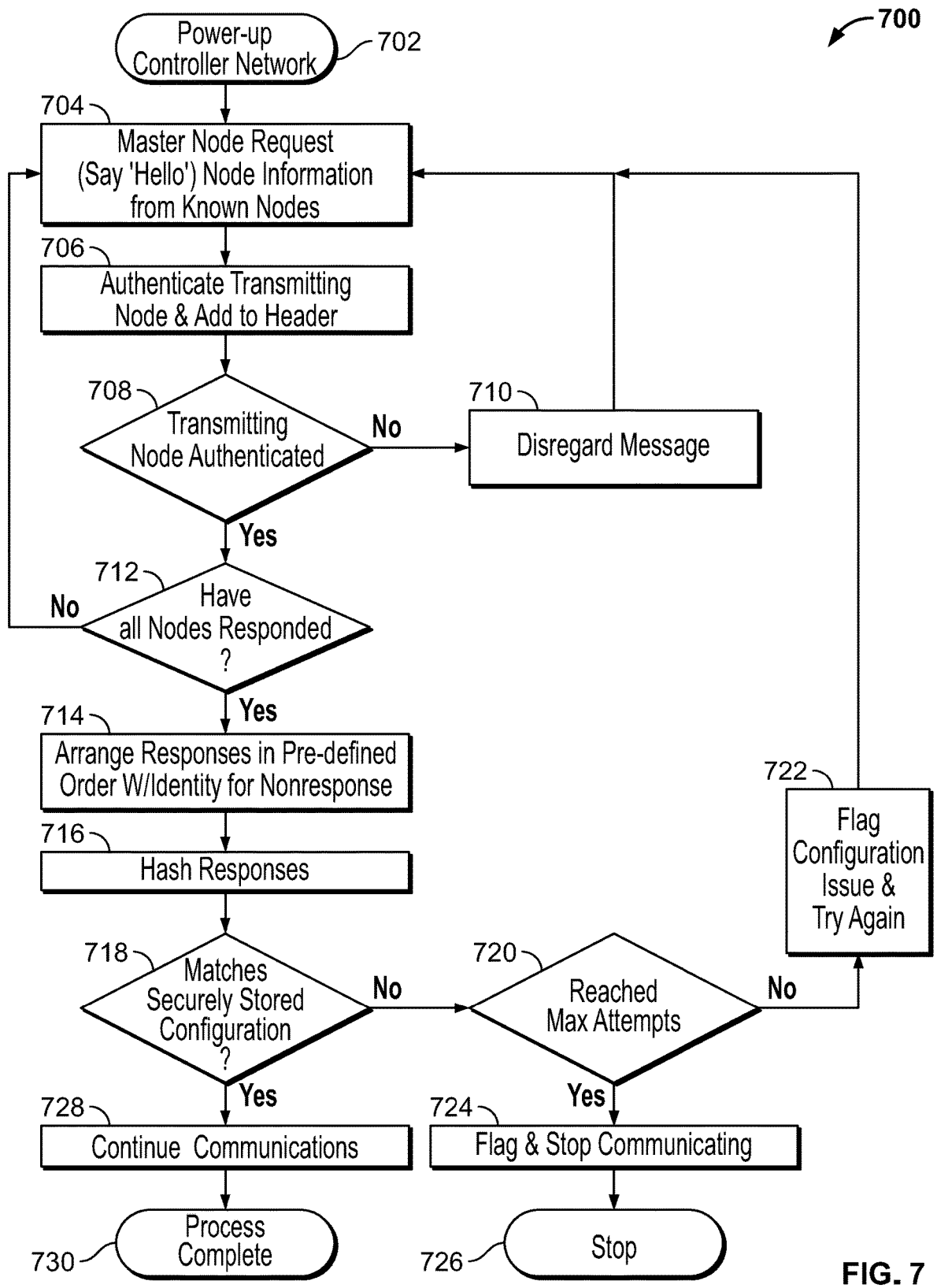
FIG. 7 is a flowchart of an example method that can be carried out by the engine control system of FIG. 2B in accordance with embodiments of the disclosed subject matter.

FIG. 7 illustrates a flowchart 700 of an example method to validate the authenticity of a system level blockchain, such as braided ring control network 500, that can be carried out by engine control system 202. Although the methods are described with reference to illustrated flowcharts, it will be appreciated that many other ways of performing the acts associated with the methods may be used. For example, the order of some operations may be changed, and some of the operations described may be optional.

Beginning at step 702, the control network powers up. At step 704, a master node, such as MCN 502, 552, requests node data from control nodes. For example, MCN 502 may request data stored in respective unit level blockchains 602, 604, 606, 608, 610 from CNs 506, 508, 510, 512, 514.

Proceeding to step 706, the master node authenticates the transmitting control nodes. At step 708, if the transmitting control node was not successfully authenticated (e.g., authentication failed), the method proceeds to step 710, where the received data from the transmitting control node is disregarded (e.g., deleted). The method then proceeds back to step 704, where the master node again requests node data from the transmitting control node.

Otherwise if, at step 708, the transmitting node is successfully authenticated, the method proceeds to step 712, where a determination is made as to whether all control nodes have responded. If at least one control node has not responded, the method proceeds back to step 704, where the master node again requests node data from control node that have yet to respond. Otherwise, if all control nodes have responded, the method proceeds to step 714.

At step 714, the master node arranges the responses from the control nodes is a predefined order. For example, the master node may arrange the responses based on a predefined list identifying the order of the responses for each control node. If a control node has not responded, the master node will identify that control node as non-responsive. The method then proceeds to step 716, where the master node executes a hashing algorithm on each of the arranged responses to generate a hash for each response. In some examples, the master node executes a hashing algorithm on the entirety of the arranged responses (e.g., one hash is generated based on the entirety of the arranged responses).

Proceeding to step 718, a determination is made as to whether each hash matches a securely stored hash (e.g., the securely stored hash may be located in a secure non-volatile memory). For example, if a hash was generated for each response, each hash is compared with a corresponding securely stored hash. If instead one hash was generated for the entirety of the arranged responses, the one hash is compared to a corresponding securely stored hash. In some examples, the determination is made by an airframe computing device, such as airframe computing device 800 discussed below with respect to FIG. 8.

If a generated hash does not match its corresponding securely stored hash, the method proceeds to step 720, where a determination is made as to whether a maximum number of attempts (e.g., five) have been made to authenticate the control network. If authentication of the control network has not been attempted the maximum number of attempts, the method proceeds to step 722 where the attempt is flagged. For example, a counter may be incremented to indicate the authentication attempt. The method then proceeds back to step 704, where the master node again requests node data from the control nodes. Otherwise, if at step 720, the maximum number of attempts have been made, the method proceeds to step 724, where the authentication failure is flagged and communications with the control nodes is ended. The method then ends at step 726, where the control network is not allowed to operate. For example, a machine, such as a gas turbine engine, is not allowed to operate.

Referring back to step 718, if the generated hashes match the securely stored hashes, the method proceeds to step 728, where authentication success may be flagged and communications with the control nodes is allowed to proceed. At step 730, the authentication procedure is complete and the control network is allowed to operate. For example, a machine, such as a gas turbine engine, is allowed to operate.

Figure 8:
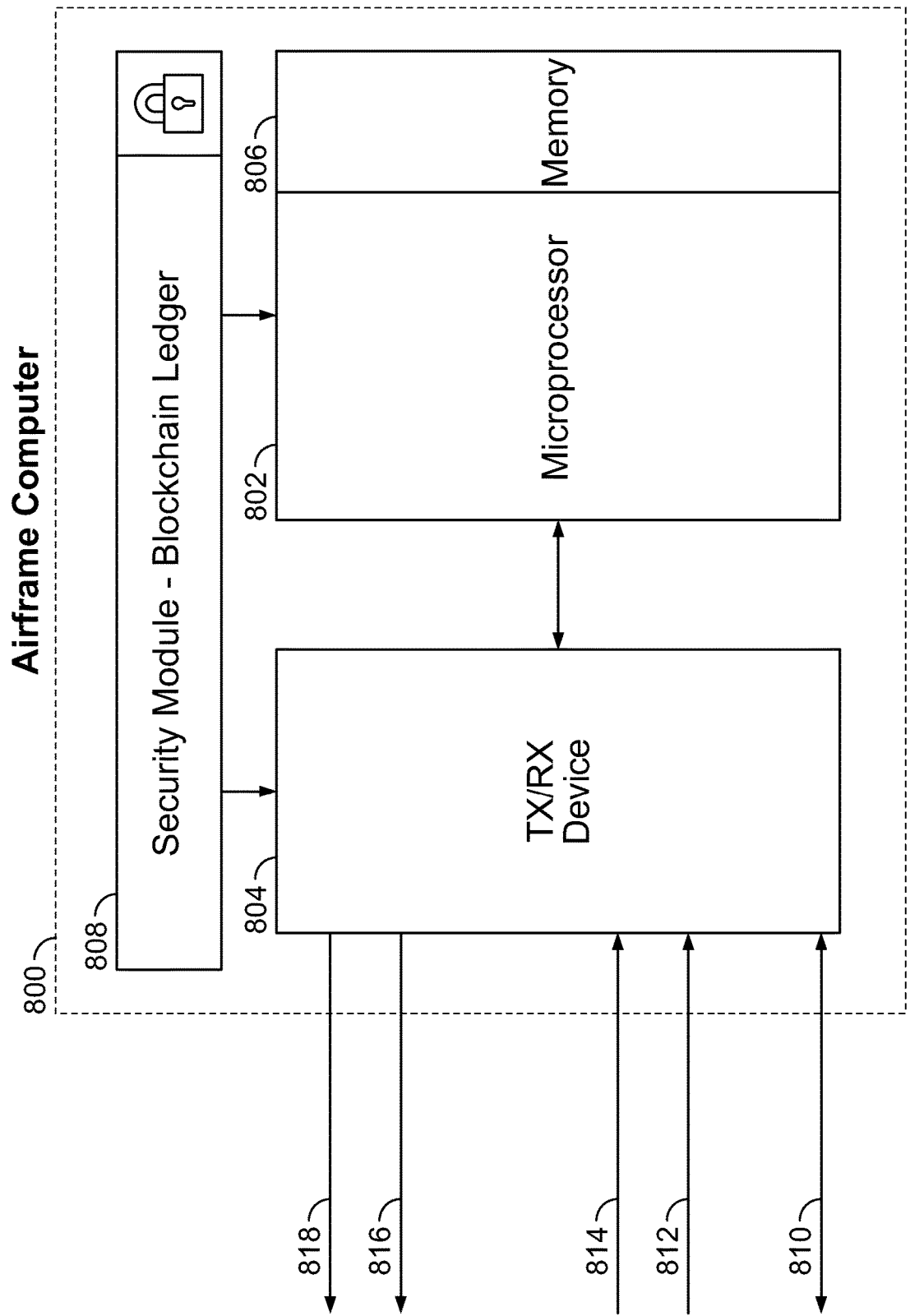
FIG. 8 illustrates an airframe computing device employing a secure blockchain ledger in accordance with embodiments of the disclosed subject matter.

FIG. 8 illustrates an airframe computing device 800 that includes a secure blockchain ledger 808. Blockchain ledger 800 may be stored within a security module of airframe computing device 800, for example. Airframe computing device 800 further includes a transceiver 804, a computing device 802, a maintenance port 810, and memory 806. Computing device 802 may be, for example, a microprocessor, a CPU, or any other suitable computing device. In some examples, computing device 802 includes multiple cores (e.g., CPUs) that may be utilized as backups. Memory 806 may be any suitable working memory such as RAM, for example. Transceiver 804 may include communication interfaces to one or more master nodes, such as MCNs 502, 552. In this example, transceiver 804 includes output communication interfaces 816, 818, and input communication interfaces 812, 814. The communication interfaces may be part of one or more optical network busses, for example.

Airframe computing device 800 may request hashed blockchain data via transceiver 804 over communication interface 818 from a first MCN, such as MCN 502, for example. In response, the first MCN may transmit the hashed blockchain data to airframe computing device 800 over communication interface 814. For example, MCN 502 may receive a request for blockchain data and in response transmit hashes, such as hashes generated in step 716 of FIG. 7 discussed above. Similarly, airframe computing device 800 may request hashed blockchain data via transceiver 804 over communication interface 816 from a second MCN, such as MCN 552, for example. In response, the second MCN may transmit the hashed blockchain data to airframe computing device 800 over communication interface 812. For example, MCN 552 may receive a request for blockchain data and in response transmit generated hashes.

For each received hash, airframe computing device 800 may determine whether the hash matches a corresponding securely stored hash stored in blockchain ledger 808. If the hashes match, airframe computing device 800 may determine that the control network is authenticated and allow the control network to operate. Otherwise, if one or more hashes do not match, airframe computing device 800 may determine that the control network has not been authenticated and may not allow the control network to operate.

Figure 9:
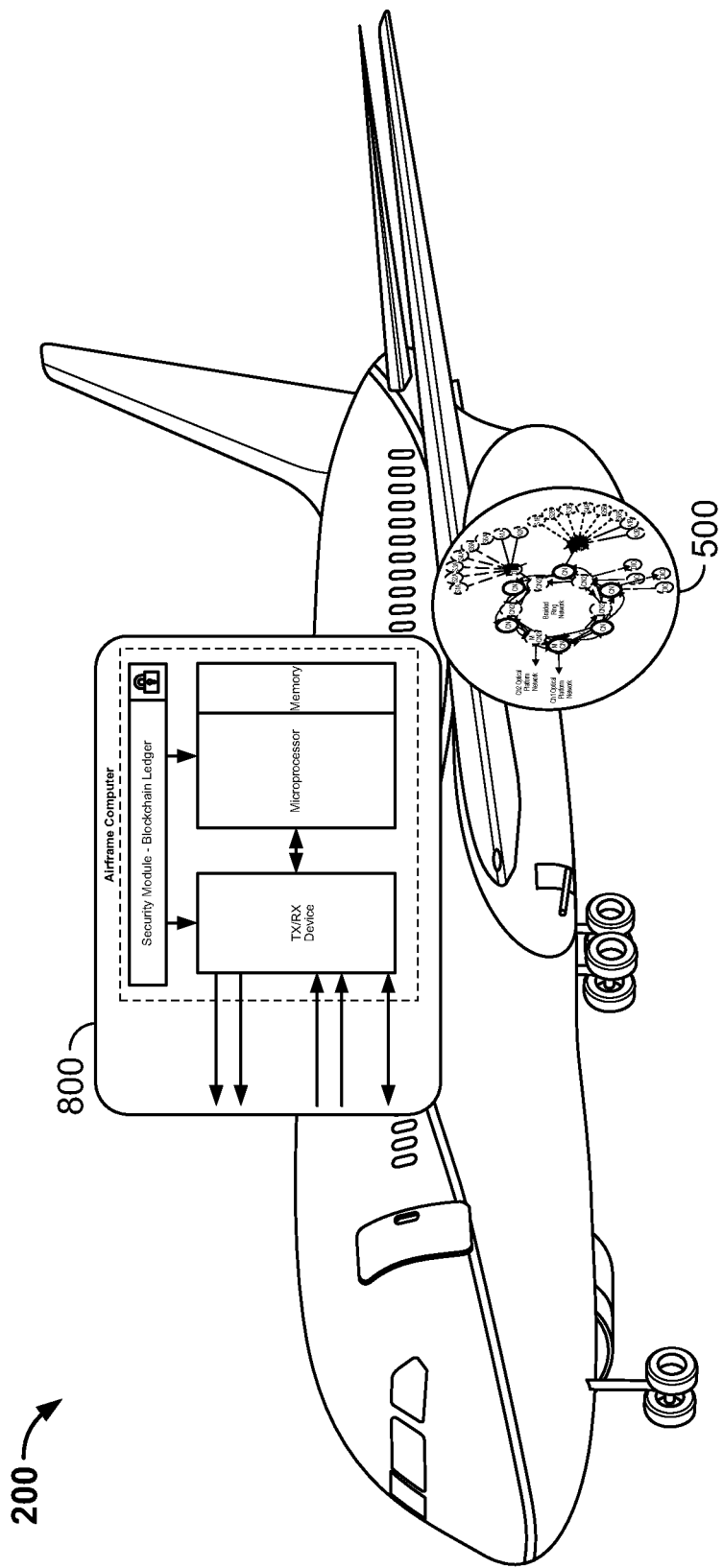
FIG. 9 illustrates an aircraft employing the airframe computing device of FIG. 8 in accordance with embodiments of the disclosed subject matter.

FIG. 9 illustrates the aircraft 200 of FIG. 2 employing the airframe computing device 800 of FIG. 8, along with the braided ring control network 500 of FIG. 6.

Among other advantages, the control system and methods described herein may provide for data security and cyber security countermeasures within a control system. The disclosed apparatus and methods may advantageously confirm part authenticity and hardware and software configurations, for example. In addition, the apparatus and methods may protect against cyber threats to the control system, among other advantages. Those of ordinary skill in the art having the benefit of the disclosures herein would recognize these and other advantages as well.

Although examples are illustrated and described herein, embodiments are nevertheless not limited to the details shown, since various modifications and structural changes may be made therein by those of ordinary skill within the scope and range of equivalents of the claims.

What is claimed is:

1. A method for securely controlling a braided ring network having a plurality of dependent control nodes and a plurality of master control nodes, each of the plurality of dependent control nodes associated with a respective distributed I/O node, the distributed I/O nodes interfacing with at least one peripheral device, the method comprising:

at each of the plurality of dependent control nodes:

maintaining a unit level distributed ledger, wherein the unit level distributed ledger comprises information from distributed I/O nodes associated with the respective control nodes; and transmitting a portion of the unit level distributed ledger to a respective one of the plurality of master control nodes;

at each of the plurality of master control nodes:

maintaining, a system level distributed ledger, wherein the system level distributed ledger comprises information from the unit level distributed ledger of the control nodes associated with the respective master control node; and transmitting the portion of the system level distributed ledger to a central processor; and at the central processor:

maintaining a separate central distributed ledger for each of the system level distributed ledgers received from the master control nodes.

2. The method of claim 1, further comprising comparing a respective received system level distributed ledger with the respective central distributed ledger, wherein the braided ring network controls an operation of a machine, and the machine is operated based on the comparison.

3. The method of claim 2, further comprising updating the unit level distributed ledgers, system level distributed ledgers, and the central distributed ledgers subsequent the operation of the machine.

4. The method of claim 1, further comprising at each of the distributed I/O nodes:

maintaining a device level distributed ledger, wherein the device level distributed ledger comprises a local hash of information related to the at least one peripheral device associated with the distributed I/O; and transmitting a portion of the device level distributed ledger to the respective control node.

5. The method of claim 1, wherein the peripheral device is a sensor or actuator.

6. The method of claim 2, wherein the machine is a gas turbine and the operation is starting the gas turbine.

7. The method of claim 4 further comprising, at the control node, comparing a portion of the respective device level distributed ledger with the respective unit level distributed ledger and operating a machine based on the comparison.

8. The method of claim 1 further comprising, at the master control node, comparing a portion of respective unit level distributed ledger with the respective system level distributed ledger and operating a machine based on the comparison.

9. The method of claim 1, wherein the portion of the unit level distributed ledger comprises a hash.

10. The method of claim 1, wherein the portion of the system level distributed ledger comprises a hash.

11. The method of claim 1, wherein the step of transmitting the portion of the unit level distributed ledger to the respective one of the plurality of master control nodes includes encrypting a message with one of a private key or public key.

12. The method of claim 1, wherein the step of transmitting the portion of the system level distributed ledger to the central processor includes encrypting a message with one of a private key or public key.

13. The method of claim 1, wherein the unit level distributed ledger comprises a digital certificate and data from at least a preceding engine start, and wherein the step of transmitting the portion of the unit level distributed ledger to the respective one of the plurality of master control nodes further comprises updating the unit level distributed ledger.

14. The method of claim 13, wherein the data is selected from the group consisting of manufacturer, serial number of a smart node, software configuration, date of manufacture, date of qualification, public key and a preceding hash.

15. The method of claim 13, wherein the step of updating the unit level distributed ledger further comprises deleting a preceding block from the unit level distributed ledger.

* * * * *